(12) United States Patent
Aguilar et al.

(10) Patent No.: US 12,269,138 B2
(45) Date of Patent: Apr. 8, 2025

(54) CENTERING MECHANISMS FOR PRECISION ALIGNMENT OF A COMPONENT OR WARE

(71) Applicant: CORNING INCORPORATED, Corning, NY (US)

(72) Inventors: Alejandro Aguilar, Painted Post, NY (US); Kevin Eugene Elliott, Newton, NC (US)

(73) Assignee: CORNING INCORPORATED, Corning, NY (US)

( * ) Notice: Subject to any disclaimer, the term of this patent is extended or adjusted under 35 U.S.C. 154(b) by 247 days.

(21) Appl. No.: 17/983,795

(22) Filed: Nov. 9, 2022

(65) Prior Publication Data

US 2023/0158620 A1    May 25, 2023

Related U.S. Application Data

(60) Provisional application No. 63/347,204, filed on May 31, 2022, provisional application No. 63/282,805, filed on Nov. 24, 2021.

(51) Int. Cl.
*B23Q 3/18*    (2006.01)
*G05B 19/402*    (2006.01)

(52) U.S. Cl.
CPC .......... *B23Q 3/183* (2013.01); *G05B 19/402* (2013.01); *G05B 2219/50047* (2013.01); *Y10T 82/2597* (2015.01)

(58) Field of Classification Search
CPC ........ B23Q 3/18; B23Q 3/183; Y10T 82/2597
See application file for complete search history.

(56) References Cited

U.S. PATENT DOCUMENTS

| | | | |
|---|---|---|---|
| 5,915,678 A | 6/1999 | Slocum et al. | |
| 6,659,261 B2 * | 12/2003 | Miyakawa | B25B 5/163 198/345.1 |
| 6,672,185 B1 * | 1/2004 | Behnke | B23Q 1/76 82/162 |
| 9,283,658 B2 | 3/2016 | Marple et al. | |

* cited by examiner

Primary Examiner — Tyrone V Hall, Jr.
(74) Attorney, Agent, or Firm — Kevin M. Able

(57) ABSTRACT

Centering apparatuses and methods for precision placement of a product or component, such as a ceramic honeycomb body, prior to a post-production processing steps are provided. In particular, after extrusion of a component or ware, the component or ware oftentimes requires one or more post-production processing steps in order to obtain a final product. The centering apparatuses and methods described herein provide for the precise and accurate centering of the product (or component) prior to performing these post-production processing steps, thereby obtaining repeatable, consistent, high-quality final products.

20 Claims, 7 Drawing Sheets

CENTERING MECHANISMS FOR PRECISION ALIGNMENT OF A COMPONENT OR WARE

CROSS REFERENCE TO RELATED APPLICATION

This application claims the benefit of priority under 35 U.S.C. § 119 of U.S. Provisional Application Ser. No. 63/282,805 filed on Nov. 24, 2021 and U.S. Provisional Application Ser. No. 63/347,204 filed on May 31, 2022, the content of which is relied upon and incorporated herein by reference in its entirety.

FIELD OF THE DISCLOSURE

The present disclosure is directed generally to precision placement systems, specifically to centering systems and methods for precision alignment of components and wares.

BACKGROUND

When manufacturing ceramic honeycomb bodies, such as filters and substrates used in exhaust systems, one or more post-production processing steps may need to be performed prior to obtaining a final product. For example, a ceramic honeycomb body produced using an extrude-to-shape ("ETS") process may require edge beveling, coating, and/or other post-production processing steps. Moreover, the precise and accurate centering of the product (or component) prior to performing these post-production processing steps is an important consideration to obtaining repeatable and consistent, high-quality final products.

SUMMARY OF THE DISCLOSURE

The present disclosure relates to apparatuses for precision alignment of a component or ware and methods of centering such components or wares.

In a first example, a centering apparatus for centering a ware is provided. The centering apparatus comprises: at least a first moveable arm and at least a second moveable arm that are configured to be positioned on opposite sides of the ware; a first rotatable support secured to the first moveable arm, wherein the first rotatable support is configured to rotate about a first rotation axis; a first pair of followers mounted to the first rotatable support; second and third rotatable supports secured to a second moveable arm, wherein the second and third rotatable supports are configured to rotate about second and third rotation axes, respectively, wherein the second and third rotation axes are coincident with each other; and a second and a third pair of followers mounted to the second and third rotatable supports, respectively, wherein the second and third rotation axes of the second and third rotatable supports are perpendicular to the first rotation axis of the first rotatable support.

In an aspect, the first rotation axis or an axis coincident with the second and third rotation axes is perpendicular to a central axis of the ware.

In an aspect, the first rotation axis or an axis coincident with the second and third rotation axes is parallel to a central axis of the ware.

In an aspect, the first rotation axis is parallel to a central axis of the ware and an axis coincident with the second and third rotation axes is perpendicular to the central axis of the ware.

In an aspect, the followers of the first, second, and third pairs of followers are radiused, beveled, or tapered to enable single points of contact with surfaces of the ware.

In an aspect, the single points of contact of the followers of the first pair of followers are positioned between the single points of contact of the followers of the second pair of followers and the single points of contact of the first pair of followers are positioned between the single points of contact of the followers of the third pair of followers.

In an aspect, the single points of contact of the followers of the first pair of followers are aligned with a center of rotation of the second rotatable support and a center of rotation of the third rotatable support, wherein the centers of rotation are coincident with each other along an axis that is coincident with the second and third rotation axes.

In an aspect, the first and second moveable arms are coupled together and connected to a mount for supporting the ware for centering.

In an aspect, the followers of the first pair of followers are symmetrically located about the first rotation axis, the followers of the second pair of followers are symmetrically located about the second rotation axis, and the followers of the third pair of followers are symmetrically located about the third rotation axis.

In an aspect, the followers are rollers.

In an aspect, the first pair of followers are positioned relative to the second and third pairs of followers to constrain movement of the ware when centered in three degrees of freedom, wherein the three degrees of freedom comprise translation in an x-axis direction, translation in a y-axis direction, and rotation about a z-axis direction.

In another example, methods of manufacturing a ceramic honeycomb structure are provided. The methods can comprise: forming a honeycomb structure using a centering apparatus as described herein.

In another example, methods of inspecting a ceramic honeycomb structure are provided. The methods can comprise: forming a honeycomb structure and inspecting the honeycomb structure using a centering apparatus of the present disclosure.

In an aspect, the inspecting occurs when the honeycomb structure is in a green state.

In an aspect, the method further comprises firing the honeycomb structure and the inspecting occurs after the firing.

In still another example, methods for centering a component or ware are provided. The methods can comprise: positioning the component between two or more moveable arms comprising at least a first moveable arm and at least a second moveable arm that are configured to be positioned on opposite sides of the component; engaging, by a first pair of followers, a vertical circumferential side surface of the component, wherein the first pair of followers is mounted to a first rotatable support that is secured to the first moveable arm, and wherein the first rotatable support is configured to rotate about a first rotation axis; engaging, by second and third pairs of followers, an opposite side of the vertical circumferential side surface of the component, wherein the second and third pairs of followers are mounted to second and third rotatable supports, respectively, which are secured to the second moveable arm, and wherein the second and third rotatable supports are configured to rotate about second and third rotation axes, respectively, wherein the second and third rotation axes are coincident with each other, and wherein the first rotation axis is perpendicular to the second and third rotation axes; and centering the component relative to the two or more moveable arms with the first, second, and third pairs of followers.

In an aspect, the method can further comprise orienting the first rotation axis or an axis coincident with the second and third rotation axes such that the first rotation axis or the coincident axis is perpendicular to a central axis of the component.

In an aspect, the method can further comprise orienting the first rotation axis or an axis coincident with the second and third rotation axes such that the first rotation axis or the coincident axis is parallel to a central axis of the component.

In an aspect, engaging the first, second, and third pairs of followers with the vertical circumferential surface can further comprise establishing single points of contact with the vertical circumferential surface, and positioning the single points of contact of the followers of the first pair of followers between the single points of contact of the followers of the second pair of followers and the single points of contact of the followers of the third pair of followers.

In an aspect, positioning of the single points of contact of the followers of the first pair of followers comprises aligning the single points of contact of the followers of the first pair of followers with a center of rotation of the second rotatable support and a center of rotation of the third rotatable support, wherein the centers of rotation are coincident with each other along an axis that is coincident with the second and third rotation axes.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF EMBODIMENTS

The present disclosure provides apparatuses and methods for precision alignment of a product, component, or ware prior to performing one or more post-production processing steps. For example, the apparatuses and methods described herein improve the repeatability and consistency of post-production processing steps to provide a high-quality line of final products. In addition to reducing process variations, the apparatuses and methods described herein also lead to less wear and maintenance of associated machines. In particular, the apparatuses and methods of the present disclosure utilize multiple rotatable supports that are mounted onto two or more moveable arms and have multiple followers that engage the ware to precisely and accurately constrain the ware at multiple, corresponding single points of contact.

Figure 1:
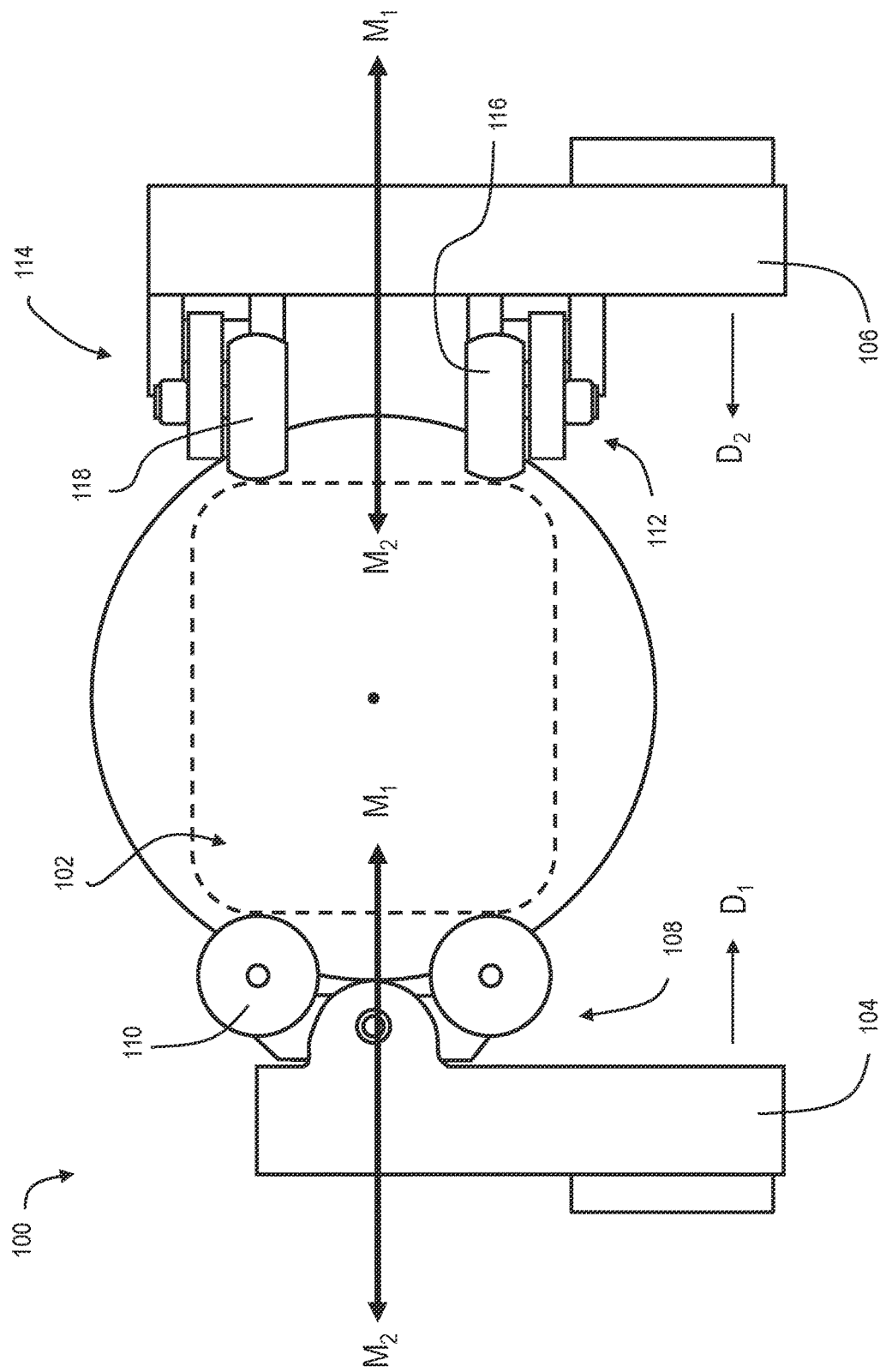
FIG. 1 is a first top view schematic of a centering apparatus for centering a ware according to certain aspects of the present disclosure.

Turning to FIG. 1, a top view of a centering apparatus 100 for centering a ware (or component) 102 is illustrated in accordance with various aspects of the present disclosure. The centering apparatus 100 comprises at least a first moveable arm 104 and at least a second moveable arm 106, which face in opposing directions $D_1$ and $D_2$, respectively. In other words, the first moveable arm 104 and the second moveable arm 106 are positioned on opposite sides of the ware 102. As such, the directions $D_1$ and $D_2$ are parallel and facing opposite directions (i.e., have 180° rotation between them), with the ware 102 positioned between the first and second moveable arms 104, 106. Further, the moveable arms 104, 106 can be configured to independently move in directions $M_1$ and $M_2$, depending on the geometry of the ware 102 or the stage of processing in order to engage or disengage the ware 102. In particular, directions $M_1$ and $M_2$ are coincident with directions $D_1$ and $D_2$.

Each moveable arm 104, 106 can comprise one or more rotatable supports 108, 112, 118 secured to a moveable arm 104, 106. For example, as shown in FIG. 1, the first moveable arm 104 comprises a first rotatable support 108 secured to the first moveable arm 104, while the second moveable arm 106 comprises a second rotatable support 112 and a third rotatable support 118 that are secured to the second moveable arm 106.

In embodiments, each rotatable support 108, 112, 114 comprises one or more followers mounted to a rotatable support 108, 112, 118. In specific embodiments, each rotatable support 108, 112, 114 comprises a pair of followers 110, 116, 118. The followers 110, 116, 118 can be, for example, and without limitation, rollers 110, 116, 118.

Figure 2:
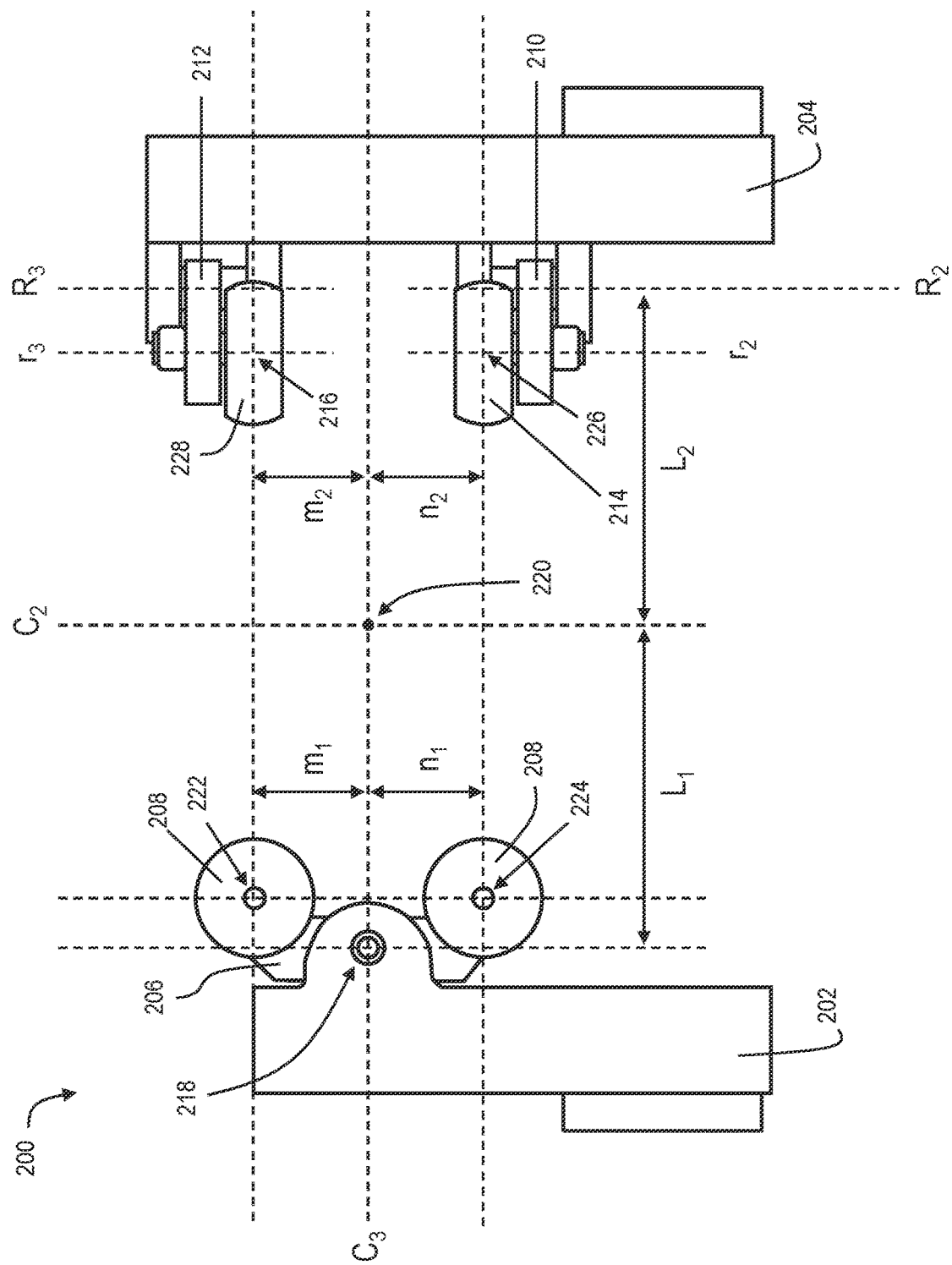
FIG. 2 is a top view schematic of a pair of moveable arms of a centering apparatus according to certain aspects of the present disclosure.

With reference to FIG. 2, further aspects of a centering apparatus 200 having a first moveable arm 202 and a second moveable arm 204 are illustrated. In particular, the first moveable arm 202 comprises a first rotatable support 206 that is secured to the first moveable arm 202 and configured to rotate about a first rotation axis $R_1$ (shown in FIG. 3B). As shown, the first rotation axis $R_1$ of the first rotatable support 206 is centered at a point 218 about which the first rotatable support 206 rotates. Similarly, the second rotatable support 210 of the second moveable arm 204 is secured to the second moveable arm 204 and configured to rotate about a second rotation axis $R_2$, while the third rotatable support 212 of the second moveable arm 204 is secured to the second moveable arm 204 and configured to rotate about a third rotation axis $R_3$.

In embodiments, the second and third rotation axes $R_2$, $R_3$ are coincident with one another. In embodiments, the second and third rotation axes $R_2$, $R_3$ are perpendicular to the first rotation axis $R_1$. That is, each moveable arm 202, 204 can have one or more rotatable supports 206, 210, 212, each rotatable support 206, 210, 212 having an independent rotational axis, where the rotational axes of each rotatable support secured to one moveable arm have parallel and/or coincident rotational axes (e.g., axes $R_2$, $R_3$) while the rotational axes of the rotatable supports secured to different moveable arms are perpendicular to one another (e.g., axis $R_1$ versus axes $R_2$, $R_3$).

Figure 5:
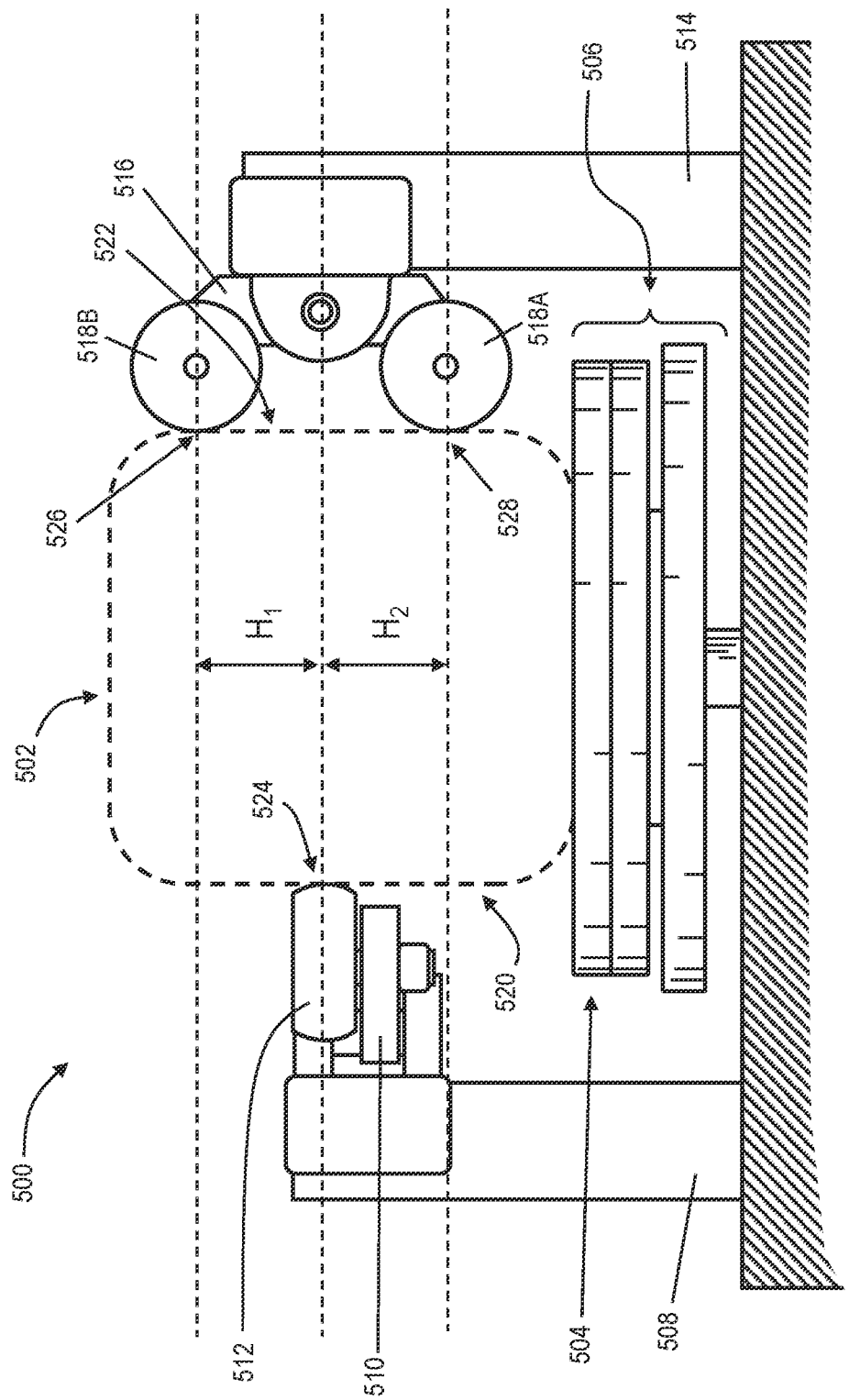
FIG. 5 is a side view schematic of a centering apparatus for centering a ware according to certain aspects of the present disclosure.
Figure 7:
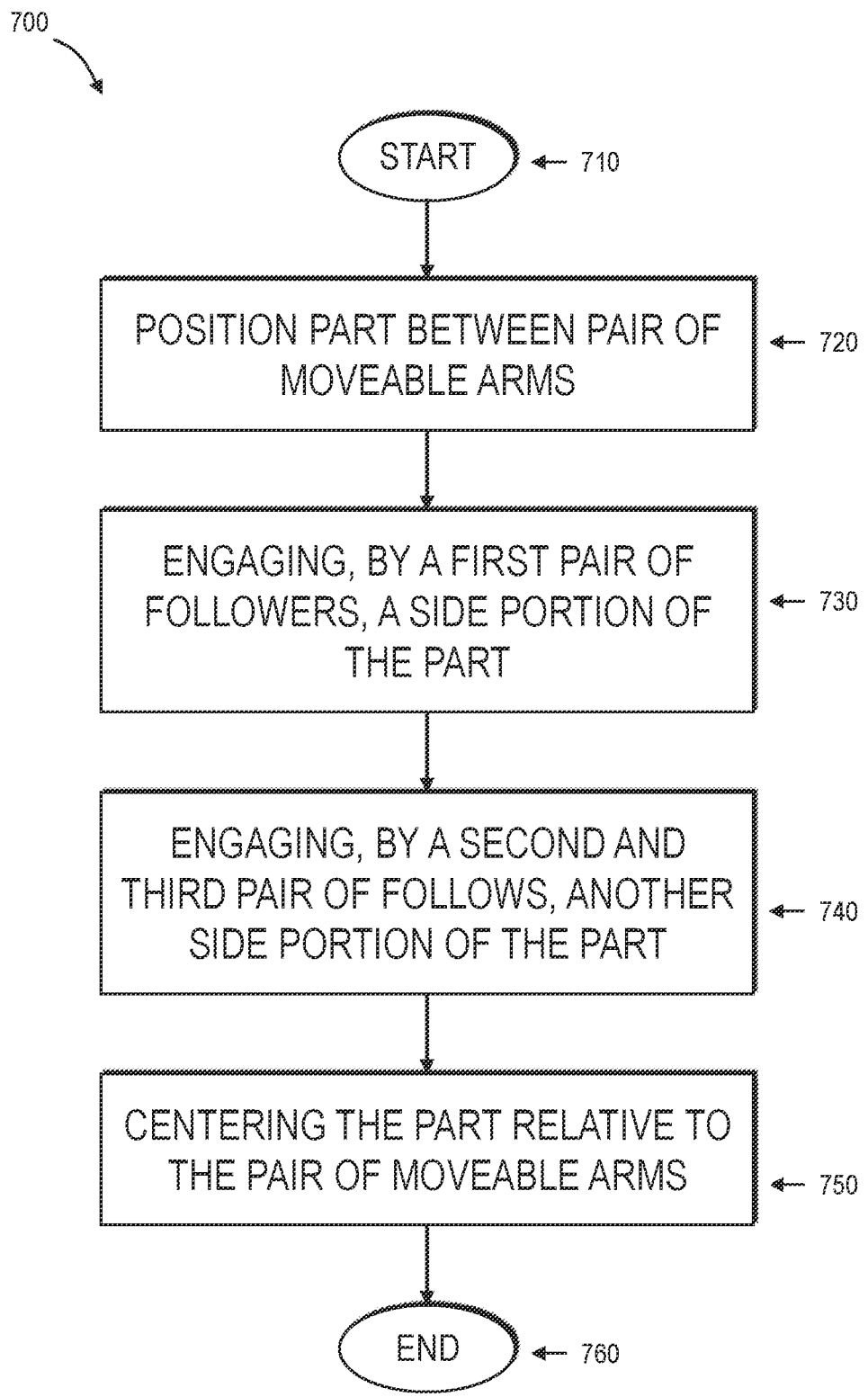
FIG. 7 is a flowchart illustrating a method of centering a component or ware on a centering apparatus according to still further aspects of the present disclosure.

In embodiments, one or more of the rotational axes (e.g., rotation axes $R_1$, $R_2$, $R_3$, etc.) are either parallel or perpendicular to a central axis of centering apparatus (e.g., central axis $C_1$ shown in FIG. 7). More specifically, the central axis $C_1$ of the centering apparatus 200 can be a central axis $C_1$ of a platform supporting a ware (e.g., platform 504 supporting ware 502 as shown in FIG. 5). As shown in FIG. 2, the central axis $C_1$ can be defined by the intersection at point 220. In embodiments, at least one of the first, second, and third rotation axes $R_1$, $R_2$, $R_3$ is perpendicular to the central axis $C_1$ of the centering apparatus 200. In embodiments, at least one of the first, second, and third rotation axes $R_1$, $R_2$, $R_3$ is parallel to the central axis $C_1$ of the centering apparatus 200. For example, and without limitation, the first rotation axis $R_1$ can be parallel to the central axis $C_1$ of the centering apparatus and the second and third rotation axes $R_2$, $R_3$ are perpendicular to the central axis $C_1$ of the centering apparatus.

The apparatus 200 illustrated in FIG. 2 further shows the spatial relationship between the first and second moveable arms 202, 204 and associated components. In particular, the distance $L_1$ between the first rotational axis $R_1$ of the first moveable arm 202 and the central axis $C_2$ of the centering apparatus 200 and the distance $L_2$ between the second and third rotational axes $R_2$, $R_3$ of the second moveable arm 204 and the central axis $C_2$ of the centering apparatus 200 are a function of the size of the ware being supported and/or the diameter of the followers 208, 214, 228. For example, $L_1$ and $L_2$ can be greater than zero but less than 2 times the radius of the ware, including about 0.5 times the radius of the ware and 1.1 times the radius of the ware. In particular embodiments, the distances $L_1$, $L_2$ are equal. In other embodiments, distance $L_1$ is greater than or less than distance $L_2$.

Additionally, each of the followers 208 or pairs of followers 214, 228 can be spaced symmetrically or asymmetrically relative to one another and/or one or more rotational axes. In embodiments, one or more of the distances $m_1$, $m_2$, $n_1$, $n_2$ can be equal. In embodiments, one or more of the distances $m_1$, $m_2$, $n_1$, and $n_2$ can be different such that $m_1$ does not equal one or more of $m_2$, $n_1$, and $n_2$, $m_2$ does not equal one or more of $m_1$, $n_1$, and $n_2$, $n_1$ does not equal one or more of $m_1$, $m_2$, and $n_1$, and $n_2$ does not equal one or more of $m_1$, $m_2$, and $n_1$. More specifically: $m_1$ is the distance between an intersection point 222 locating the center of a first follower 208 of a first rotatable support 206 and a central axis $C_3$ that crosses point 220 and is perpendicular to the rotation axis $R_1$ of the first rotatable support 206; $n_1$ is the distance between an intersection point 224 locating the center of a second follower 208 of the first rotatable support 206 and the central axis $C_3$; $n_2$ is the distance between an intersection point 226 locating a midpoint of a second pair of followers 214 and the central axis $C_3$; and $m_2$ is the distance between an intersection point 228 locating a midpoint of a third pair of followers 216 and the central axis $C_3$. In embodiments, one or more of the distances $m_1$, $m_2$, and $n_1$, and $n_2$ are a function of the size of the ware and/or the diameter of the followers 208, 214, 228. In specific embodiments, one or more of the distances $m_1$, $m_2$, and $n_1$, and $n_2$ are greater than zero but less than 2 times the radius of the ware, including about 0.5 times the radius of the ware, between about 0.8 and 0.9 times the radius of the ware, less than about 1.1 times the radius of the ware.

Figure 3B:
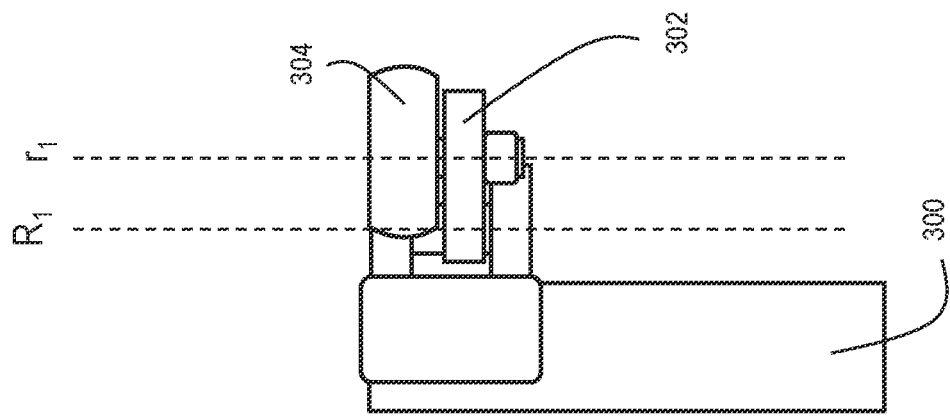
FIG. 3B is a side view schematic of the single axis moveable arm shown in FIG. 3A.
Figure 3A:
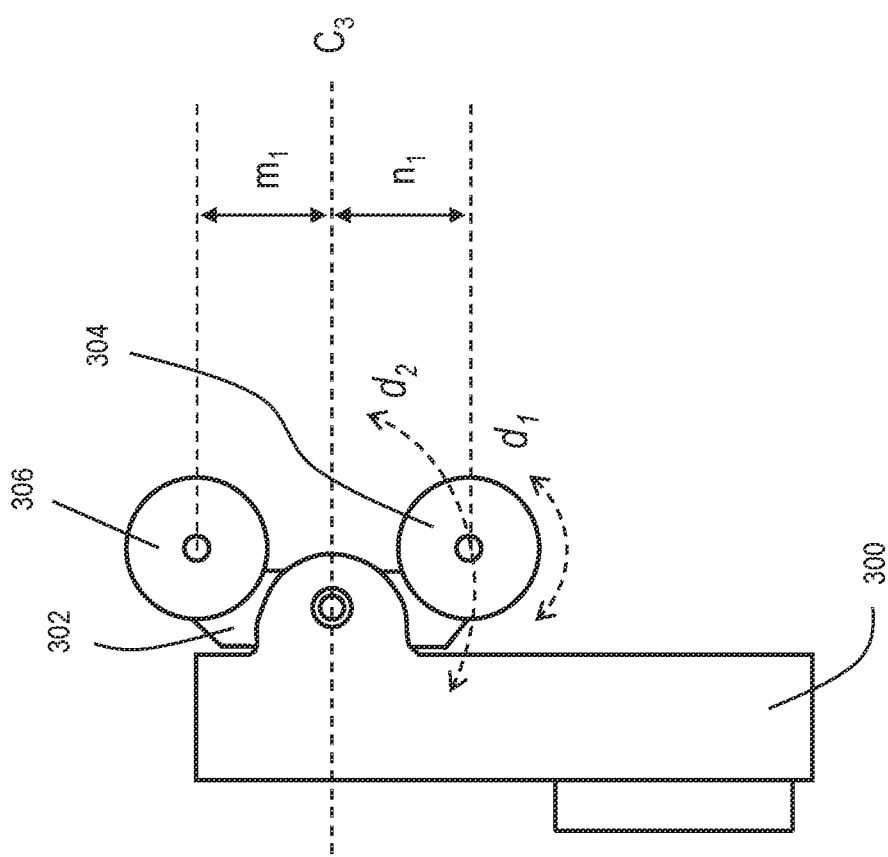
FIG. 3A is a top view schematic of a single axis moveable arm of a centering apparatus according to certain aspects of the present disclosure.

With reference to FIGS. 3A and 3B, these and other aspects of the rotatable supports (e.g., rotatable supports 206, 210, 212 shown in FIG. 2) are illustrated. As discussed above, each rotatable support 300 can be secured to an associated moveable arm 300 and can have an axis of rotation (e.g., axis $R_1$) whereby the first and second followers 304, 306 mounted to the rotatable support 302 can move in a symmetrical arc $d_1$. Further, the distance $m_1$ between the center of the follower 306 and a central axis $C_3$ can be equal to the distance $n_1$ between the center of the follower 304 and the central axis $C_3$. As such, the followers 304, 306 of the first pair of followers can be symmetrically located about a first rotation axis $R_1$ and rotate together about the first rotation axis $R_1$. Similarly, each pair of followers mounted to other rotatable supports can be symmetrically located about a second or third rotation axis and rotate about those axes (e.g., a second pair of followers 214 mounted to a second rotatable support 210 can be symmetrically located about a second rotation axis $R_2$, and a third pair of followers 216 mounted to a third rotatable support 212 can be symmetrically located about a third rotation axis $R_3$).

In embodiments, each of the followers (e.g., followers 304, 306) can independently rotate about separate roller rotation axes $r_i$ (where i corresponds to a particular follower). As shown in FIGS. 3A and 3B, the follower 304 has a roller rotation axis $r_1$ about which the follower 304 can freely spin in direction dz. In accordance with various aspects of the present disclosure, each roller (e.g., rollers 208, 214, 216, 304, 306, etc.) has its own roller rotation axis $r_i$ about which each follower independently rotates.

Figure 4B:
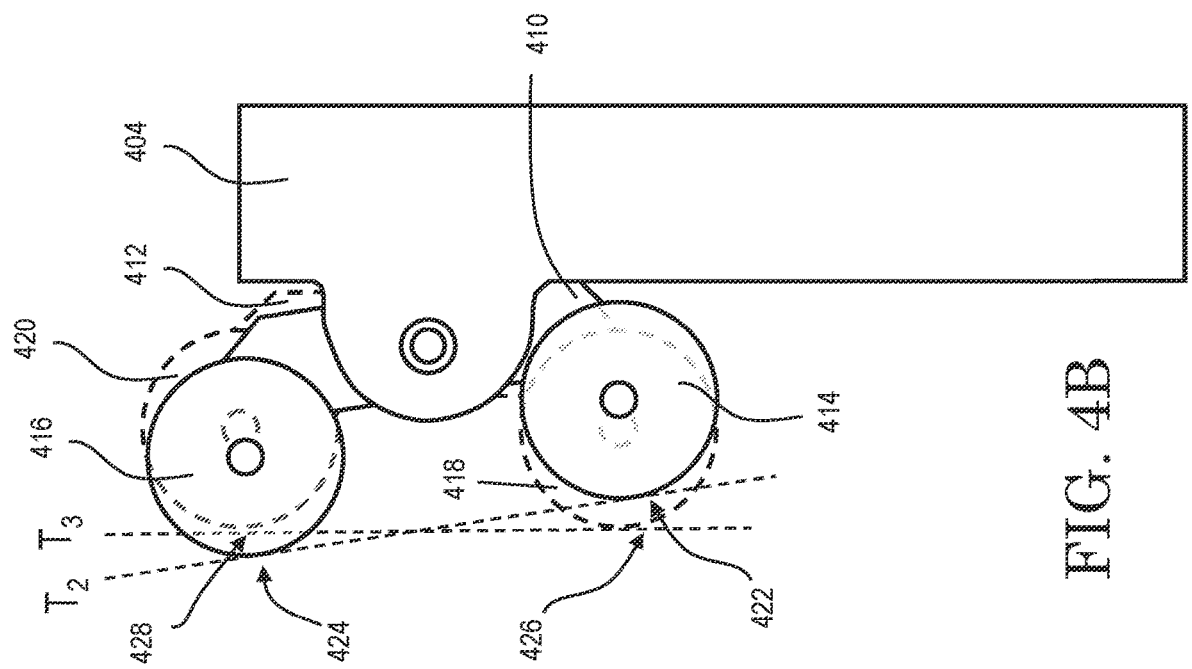
FIG. 4B shows a moveable arm of a centering apparatus according to certain aspects of the present disclosure.
Figure 4A:
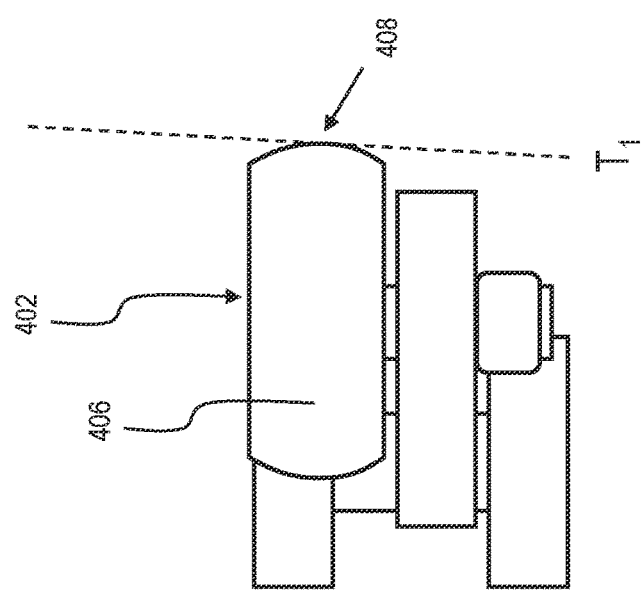
FIG. 4A shows a rotatable support according to certain aspects of the present disclosure.

As shown in FIGS. 4A and 4B, each follower 402 can be circular rollers having radiused, beveled, and/or tapered sides to enable single points of contact with a surface of the ware regardless of the angle of the surface of the ware relative to the follower 402. For example, each follower, such as follower 402, can have a radiused, beveled, and/or tapered outer surface 406 such that a surface of the ware to be centered (represented by a tangent line $T_1$) contacts the follower 402 at a single point 408.

Similarly, where the moveable arm 404 has a first and second rotatable support 410, 412, each follower 414, 416, 418, 420 is configured to engage a surface of the ware at a single point of contact, even if the surface is not flat. For example, as shown in FIG. 4B, a first rotatable support 410 has a pair of followers 414, 416 that contact a surface of the ware (represented by a tangent line $T_2$) at single points 422, 424, respectively, while a second rotatable support 412 has a pair of followers 418, 420 that contact the surface of the ware (represented by a tangent line $T_3$) at single points 426, 428, respectively.

With reference to FIG. 5, an apparatus 500 for centering a ware 502 is illustrated in accordance with still further aspects of the present disclosure. Here, the ware 502 is supported on a platform 504 of a component chuck 506 between a first moveable arm 508 having a first rotatable support 510 with a pair of followers 512 and an opposing second moveable arm 514 having a second rotatable support 516 with a pair of followers 518A, 518B as well as a third rotatable support (not visible) with a pair of followers (not visible). In particular, the followers 512 have single points of contact 524 located vertically between the single points of contact 526, 528 of the follower 518A and follower 518B, respectively. That is, the single points of contact 524 of the followers 512 of the first pair of followers 512 are positioned between the single points of contact 526, 528 of the followers 518A, 518B of the second pair of followers 518A, 518B and the single points of contact of the followers of the third pair of followers. In embodiments, the moveable arms 508, 514 and rotatable supports 510, 516 are configured such that the single points of contact 524 of the rotatable support 510 mounted on the moveable arm 508 having just a single rotatable support 510 will be located vertically between each pair of single points of contact (e.g., single points of contact 526, 528) of the rotatable supports (e.g., rotatable support 516) mounted on the moveable arm 514 having at least two rotatable supports (e.g., rotatable support 516), regardless of the rotation of the rotatable supports (e.g., rotatable supports 510, 516). In other words, the heights $H_1$ (defining the difference between an upper single point of contact 526 and an opposing single point of contact 524) and $H_2$ (defining the difference between a lower single point of contact 528 and an opposing single point of contact 524) are always greater than zero. In embodiments, the heights $H_1$ and $H_2$ are the same such that the single point of contact 524 of the followers 512 is equidistant from the single points of contact 526, 528 of the followers 518A, 518B. In embodiments, the heights $H_1$ and $H_2$ are not equivalent and therefore the single point of contact 524 of the followers 512 is not equidistant from the single points of contact 526, 528 of the followers 518A, 518B.

With further reference to FIG. 5, the apparatus 500 engages a vertical circumferential side surface 520 of the ware 502 via a first pair of followers 512 that is mounted to a first rotatable support 510, which is secured to a first moveable arm 508, while the apparatus 500 engages an opposite vertical circumferential side surface 522 of the ware 502 via a second and third pair of followers (e.g., followers 518A, 518B, etc.), which are mounted onto a second and third rotatable support (e.g., rotatable supports 516, etc.) and secured to a second moveable arm 514.

Figure 6:
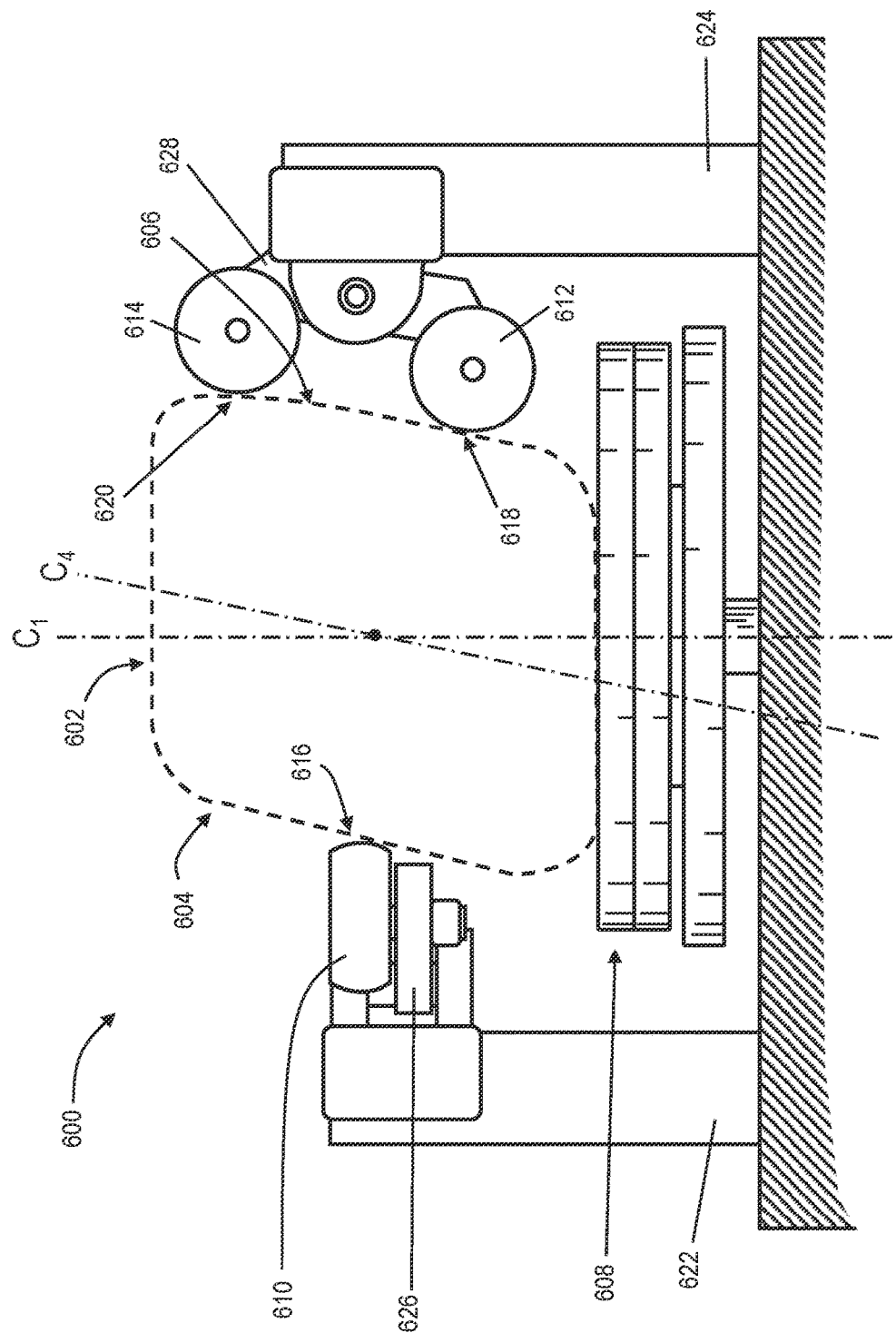
FIG. 6 is a side view schematic of a centering apparatus for centering a ware according to certain aspects of the present disclosure.

Similarly, with reference to FIG. 6, even if the ware 602 has slanted vertical circumferential side surfaces 604, 606 and a center line $C_4$ that is not parallel with a central axis $C_1$ of the associated system platform 608, the apparatus 600 can still engage a vertical circumferential side surface 604 and an opposing vertical circumferential side surface 606 via the pairs of followers (e.g., followers 610, 612, 614, etc.) by moving moveable arms 622, 624 and rotating rotatable supports (e.g., rotatable supports 626, 628, etc.) in order to establish multiple single points of contact (e.g., single points of contact 616, 618, 620) with the side surfaces 604, 606 of the ware 602. As such, the center 630 of ware 602 can still be determined and the ware 602 can still be precisely centered using the apparatus 600 despite differences in the geometry of the ware 602.

Also described herein are methods of centering a component (or ware or product) using a centering apparatus. With reference to FIG. 7, one such method 700 is illustrated. At a step 710, the method begins.

At a step 720, the method 700 comprises positioning a component between two or more moveable arms comprising a first moveable arm and a second moveable arm. In particular, the first and second moveable arms are positioned on opposing or opposite sides of the component.

At a step 730, the method 700 comprises engaging, by a first pair of followers, a vertical circumferential side surface of the component. In particular, the first pair of followers is mounted to a first rotatable support that is secured to the first moveable arm. Further, the first rotatable support can be configured to rotate about a first rotation axis.

At a step 740, the method 700 comprises engaging, by a second pair of followers and a third pair of followers, an opposite side of the vertical circumferential side surface of the component. In particular, the second pair of followers is mounted to a second rotatable support, the third pair of followers is mounted to a third rotatable support, and the second and third rotatable supports are secured to the second moveable arm. Further, the second and third rotatable supports can be configured to rotate about a second rotation axis and a third rotation axis, respectively. More specifically, the second and third rotation axes can be coincident with each other while the first rotation axis is perpendicular to both the second and third rotation axes.

In embodiments, engaging the first, second, and third pairs of followers with the vertical circumferential surfaces comprises: establishing single points of contact between each of the followers and at least one of the vertical circumferential surfaces; and positioning the single points of contact of the followers between the single points of contact of the followers of the second pair of followers and the single points of contact of the followers of the third pair of followers.

In embodiments, positioning of the single points of contact of the followers of the first pair of followers comprises aligning the single points of contact of the followers of the first pair of followers with a center of rotation of the second rotatable support and a center of rotation of the third rotatable support. In particular, the centers of rotation can be coincident with each other along an axis that is coincident with the second and third rotation axes.

At a step 750, the method 700 comprises centering the component relative to the two or more moveable arms using the first, second, and third pairs of followers. In specific embodiments, the method 700 comprises orientating the first rotation axis or an a is coincident with the second and third rotation axes such that the first rotation axis or the coincident axis is perpendicular to a central axis of an associated apparatus platform. In other embodiments, the method 700 comprises orienting the first rotation axis or an axis coincident with the second and third rotation axes such that the first rotation axis or the coincident axis is parallel to a central axis of an associated apparatus platform.

At a step 760, the method ends.

As discussed above, the component or ware can be a ceramic honeycomb body, such as a filter or substrate used in an exhaust system, which can be produced using an extrude-to-shape ("ETS") process. As such, the centering method utilizing the centering apparatuses described herein can be component of a larger manufacturing process. In particular, the method can comprise one or more post-production processing steps (e.g., edge beveling, edge grinding, coating, inspection, etc.) subsequent to centering the component. Thus, also provided herein are methods of manufacturing a ceramic honeycomb structure comprising forming a honeycomb structure using a centering apparatus of the present disclosure. Further, methods of inspecting a ceramic honeycomb structure are provided, which include inspecting the honeycomb structure using the centering apparatus of the present disclosure. In particular, the honeycomb structure can be a green honeycomb structure (i.e., un-fired), and the inspection can occur while the honeycomb structure is in this green state.

In accordance with the various aspects of the present disclosure, the centering apparatuses and centering methods described herein decrease the sensitivity of the associated processing systems to errors in the component shape, reduce the chance of damage to the component, increase centering precision, avoids bias positioning of the component due to built-in compliance, are passive and do not require adjustment or feedback after initial alignment, center the parts to within about 0.100 inch, are simple and low maintenance, and do not force out perpendicularity errors in the parts.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also comprising more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of," or "exactly one of."

As used herein in the specification and in the claims, the phrase "at least one," in reference to a list of one or more elements, should be understood to mean at least one element selected from any one or more of the elements in the list of elements, but not necessarily comprising at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean comprising but not limited to. Only the transitional phrases "consisting of" and "consisting essentially of" shall be closed or semi-closed transitional phrases, respectively.

The above-described examples of the described subject matter can be implemented in any of numerous ways. For example, some aspects can be implemented using hardware, software or a combination thereof. When any aspect is implemented at least in component in software, the software code can be executed on any suitable processor or collection of processors, whether provided in a single device or computer or distributed among multiple devices/computers.

The present disclosure can be implemented as a system, a method, and/or a computer program product at any possible technical detail level of integration. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some examples, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions can be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant can be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples can be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A centering apparatus for centering a ware, comprising:
at least a first moveable arm and at least a second moveable arm that are configured to be positioned on opposite sides of the ware;
a first rotatable support secured to the first moveable arm, wherein the first rotatable support is configured to rotate about a first rotation axis;
a first pair of followers mounted to the first rotatable support;
second and third rotatable supports secured to a second moveable arm, wherein the second and third rotatable supports are configured to rotate about second and third rotation axes, respectively, wherein the second and third rotation axes are coincident with each other; and
a second and a third pair of followers mounted to the second and third rotatable supports, respectively, wherein the second and third rotation axes of the second and third rotatable supports are perpendicular to the first rotation axis of the first rotatable support.

2. The centering apparatus of claim 1, wherein the first rotation axis or an axis coincident with the second and third rotation axes is perpendicular to a central axis of the centering apparatus.

3. The centering apparatus of claim 1, wherein the first rotation axis or an axis coincident with the second and third rotation axes is parallel to a central axis of the centering apparatus.

4. The centering apparatus of claim 3, wherein the first rotation axis is parallel to the central axis of the centering apparatus and an axis coincident with the second and third rotation axes is perpendicular to the central axis of the centering apparatus.

5. The centering apparatus of claim 1, wherein the followers of the first, second, and third pairs of followers are radiused, beveled, or tapered to enable single points of contact with surfaces of the ware.

6. The centering apparatus of claim 5, wherein the single points of contact of the followers of the first pair of followers are positioned between the single points of contact of the followers of the second pair of followers and the single points of contact of the first pair of followers are positioned between the single points of contact of the followers of the third pair of followers.

7. The centering apparatus of claim 6, wherein the single points of contact of the followers of the first pair of followers are aligned with a center of rotation of the second rotatable support and a center of rotation of the third rotatable support, wherein the centers of rotation are coincident with each other along an axis that is coincident with the second and third rotation axes.

8. The centering apparatus of claim 1, wherein the first and second moveable arms are coupled together and connected to a mount for supporting the ware for centering.

9. The centering apparatus of claim 1, wherein the followers of the first pair of followers are symmetrically located about the first rotation axis, the followers of the second pair of followers are symmetrically located about the second rotation axis, and the followers of the third pair of followers are symmetrically located about the third rotation axis.

10. The centering apparatus of claim 1, wherein the followers are rollers.

11. The centering apparatus of claim 1, wherein the first pair of followers are positioned relative to the second and third pairs of followers to constrain movement of the ware when centered in three degrees of freedom, wherein the three degrees of freedom comprise translation in an x-axis direction, translation in a y-axis direction, and rotation about a z-axis direction.

12. A method of manufacturing a ceramic honeycomb structure, comprising:
forming a honeycomb structure using the centering apparatus of claim 1.

13. A method of inspecting a ceramic honeycomb structure, comprising:
forming a honeycomb structure and inspecting the honeycomb structure using the centering apparatus of claim 1.

14. The method of claim 13, wherein the inspecting occurs when the honeycomb structure is in a green state.

15. The method of claim 13, wherein the method further comprises firing the honeycomb structure, and wherein the inspecting occurs after the firing.

16. A method for centering a component, the method comprising:
positioning the component between two or more moveable arms comprising first and second moveable arms that are configured to be positioned on opposite sides of the component;
engaging, by a first pair of followers, a vertical circumferential side surface of the component, wherein the first pair of followers is mounted to a first rotatable support that is secured to the first moveable arm, and wherein the first rotatable support is configured to rotate about a first rotation axis;
engaging, by second and third pairs of followers, an opposite side of the vertical circumferential side surface of the component, wherein the second and third pairs of followers are mounted to second and third rotatable supports, respectively, which are secured to the second moveable arm, and wherein the second and third rotatable supports are configured to rotate about second and third rotation axes, respectively, wherein the second and third rotation axes are coincident with each other, and wherein the first rotation axis is perpendicular to the second and third rotation axes; and
centering the component relative to the two or more moveable arms with the first, second, and third pairs of followers.

17. The method of claim 16, further comprising orienting the first rotation axis or an axis coincident with the second and third rotation axes such that the first rotation axis or the coincident axis is perpendicular to a central axis of an associated apparatus platform.

18. The method of claim 16, further comprising orienting the first rotation axis or an axis coincident with the second and third rotation axes such that the first rotation axis or the coincident axis is parallel to a central axis of an associated apparatus platform.

19. The method of claim 16, wherein engaging the first, second, and third pairs of followers with the vertical circumferential surface further comprises establishing single points of contact with the vertical circumferential surface, and positioning the single points of contact of the followers of the first pair of followers between the single points of contact of the followers of the second pair of followers and the single points of contact of the followers of the third pair of followers.

20. The method of claim 19, wherein positioning of the single points of contact of the followers of the first pair of followers comprises aligning the single points of contact of the followers of the first pair of followers with a center of rotation of the second rotatable support and a center of rotation of the third rotatable support, wherein the centers of rotation are coincident with each other along an axis that is coincident with the second and third rotation axes.

* * * * *